(12) United States Patent
Wielebski et al.

(10) Patent No.: US 7,062,355 B2
(45) Date of Patent: Jun. 13, 2006

(54) ELECTRICAL COMMUNICATIONS ARCHITECTURE

(75) Inventors: Wayne Wielebski, New Berlin, WI (US); John P. Caspers, Racine, WI (US); Gregory A. Majcher, Broadview Heights, OH (US); Steven P. Blech, Twinsburg, OH (US); Gregory J. Svetina, Streetsboro, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 10/195,650

(22) Filed: Jul. 12, 2002

(65) Prior Publication Data

US 2004/0007447 A1 Jan. 15, 2004

Related U.S. Application Data

(63) Continuation of application No. 09/669,822, filed on Sep. 26, 2000, now abandoned.

(51) Int. Cl.
*G06F 7/00* (2006.01)
*B65G 13/06* (2006.01)

(52) U.S. Cl. .................. 700/230; 700/228; 198/781.06

(58) Field of Classification Search ........... 198/781.06, 198/781.1; 700/230, 228
See application file for complete search history.

(56) References Cited

U.S. PATENT DOCUMENTS

| | | | | |
|---|---|---|---|---|
| 5,285,887 A | * | 2/1994 | Hall | 198/781.06 |
| 5,582,286 A | * | 12/1996 | Kalm et al. | 198/781.06 |
| 5,862,907 A | * | 1/1999 | Taylor | 198/781.06 |
| 5,906,268 A | * | 5/1999 | Kalm | 198/781.06 |
| 6,021,888 A | * | 2/2000 | Itoh et al. | 198/781.06 |
| 6,035,999 A | * | 3/2000 | Hall | 198/781.06 |
| 6,302,266 B1 | * | 10/2001 | DeFrancisco et al. | 198/781.06 |
| 6,315,104 B1 | * | 11/2001 | Ebert | 198/781.06 |
| 6,522,944 B1 | * | 2/2003 | Wielebski et al. | 198/781.1 |
| 6,701,214 B1 | * | 3/2004 | Wielebski et al. | 198/781.06 |

OTHER PUBLICATIONS

Interroll Meca, Interroll Corp., Wilminington, North Carolina, 1992. A brochure describing an electric conveyor roller.*

* cited by examiner

*Primary Examiner*—Douglas Hess
(74) *Attorney, Agent, or Firm*—Quarles & Brady, LLP; Alexander M. Gerasimow

(57) ABSTRACT

An electrical communications architecture for implementation in a conveyor system, and a method of communicating information among components of a conveyor system, are disclosed. The electrical communications architecture includes a central control device, first and second conveyor modules, and an address-based network. The conveyor modules respectively support first and second control devices and associated first and second sensors. The network couples all of the control devices, and each control device has a respective address on the network. Information is communicated between the associated sensors and control devices by way of respective dedicated connections, and information is communicated among the control devices by way of the network. The first control device operates based upon a program including instructions from the central control device indicative of the address of the second control device with which the second sensor is associated, from which the first control device is to receive sensor information.

6 Claims, 2 Drawing Sheets

ELECTRICAL COMMUNICATIONS ARCHITECTURE

CROSS-REFERENCE TO RELATED APPLICATIONS

This application is a continuation of U.S. patent application Ser. No. 09/669,822 filed Sep. 26, 2000, now abandoned, and entitled "Modular Conveyor With Address-Based Network for Inter-Conveyor Communication" and claims the benefit thereof.

STATEMENT REGARDING FEDERALLY SPONSORED RESEARCH OR DEVELOPMENT

FIELD OF THE INVENTION

The present invention relates to an electrical communications architecture for implementation in conveyor systems that move objects along guided tracks. In particular, the present invention relates to an electrical communications architecture that provides electrical communications between and among a central device and multiple conveyor sections ("sticks").

BACKGROUND OF THE INVENTION

Conveyor systems for moving objects between stations in a manufacturing environment or for accumulating and distributing products in a warehouse operation are well known in the art. Such conveyor systems provide upwardly exposed conveying surfaces, such as rollers, positioned between guiding side rails. The rollers are powered by controllable motors to move objects placed on top of them along a track defined by the rails.

Assembly of conveyor systems is facilitated by the use of "conveyor sticks" comprised of short sections of rollers and guide rails, which are connected together to form the final conveyor system. This modular construction also simplifies changes in the layout of the conveyor system.

The conveying surface of each conveyor stick may be broken up into one or more zones, each associated with a sensor for detecting the presence of an object on the conveyor at the zone. A control circuit communicates with each zone and sensor via a number of cables to control the zones so as to accomplish a number of standardized tasks.

One task is that of "accumulation" in which the control circuit for a given zone operates its rollers when the sensor, in an upstream zone, indicates an object is at that zone and the sensor of a "downstream" zone indicates that no object is in that downstream zone. This logic causes the conveyor zones to move objects along to fill all zones with objects.

In a "slug release" operation, each control circuit in a defined release zone operates its rollers if its sensor indicates an object is present and no object is in the downstream zone from the defined release zone. This logic causes the emptying of a predefined section of the conveyor, typically to a downstream portion.

A third mode of operation is "singulation release" in which a single object at a time is unloaded from the conveyor system 10. Each upstream control circuit operates its rollers to move its objects downstream one zone.

In order to perform these tasks, the control circuit for each conveyor stick must communicate in a limited fashion with the control circuits (or at least the sensors) of the upstream and downstream conveyor sticks. This is done by cabling between control cards or sensors of the conveyor stick, typically within one of the side rails.

Advantageously, the conveyor system as described operates without the need for a central controller, for example, such as may require several dedicated I/O points for each zone together with the need to route a large number of wires through the cable raceways between the conveyors and the central controller. By eliminating the need for this wiring, the conveyor sticks can be easily assembled or reconfigured. Nevertheless, the lack of central control makes the conveyor system relatively hard to reconfigure requiring, for example, settings to being manually adjusted on each controller board when delay times and conveyor speeds are changed. Further, lack of centralized communication between components of the conveyor system makes it difficult to detect and report conveyor system problems such as motor failure or material jamming.

BRIEF SUMMARY OF THE INVENTION

The present invention provides a network that connects the conveyor sticks together for control, monitoring or configuration of the conveyor sticks from a central device. Dedicated wiring needed for control between adjacent conveyor sticks is eliminated by routing these signals on the same network. A single set of wires thus provides for central control, monitoring and programming of the conveyor sections as well inter-section communication needed for autonomous operation of the conveyor.

Specifically, then, the present invention provides a modular conveyor system formed of conveyor sections with separated upstream and downstream ends having mechanical connectors for connecting to downstream and upstream ends, respectively, of other conveyor sections. The conveyor sections support motorized roller assemblies and associated object sensors sensing objects on the conveyor section. Also in the section, a communications port connects to an address-based network for sending outgoing addressed data to other devices on the address-based network and for receiving incoming addressed data from other devices. Logic circuitry communicating with or being part of the communications port, receives an object presence signal from the object sensor and provides a control signal controlling activation of the motorized roller assemblies based on the object presence signal and an external object presence signal associated with at least one of the other conveyor sections. The external object presence signal is received as incoming addressed data from the communications port. The logic circuitry may further transmit its object presence signal as outgoing addressed data through the communications port.

The present invention in particular relates to an electrical communications architecture for implementation in a conveyor system. The electrical communications architecture includes a central control device. The electrical communications architecture further includes at least first and second conveyor modules, the first and second conveyor modules supporting first and second control devices, respectively, the first and second conveyor modules further supporting first and second sensors associated with the first and second control devices, respectively. The electrical communications architecture additionally includes an address-based network coupling the central control device, the first control device, and the second control device, where each of the central control device, the first control device and the second control device has a respective address with respect to the address-based network. Information is communicated between the first sensor and the first control device, and between the second sensor and the second control device, by way of respective first and second dedicated connections. Also, information is communicated between the central control device and each of the first and second control devices, and between the first and second control devices, by way of the address-based network. The first control device operates based upon a program including instructions downloaded from the central control device, where the instructions are indicative of the address of the second control device with which the second sensor is associated, from which the first control device is to receive sensor information.

Additionally, the present invention relates to an electrical communications architecture for implementation in a conveyor system. The electrical communications architecture includes a plurality of conveyor modules, a central control device, a plurality of operational devices respectively supported by the plurality of conveyor modules, and network means for providing communication signals among the central control device and the plurality of operational devices, the network means being coupled to the central control device and each of the plurality of operational devices. The communication signals are provided based upon addresses embedded within the communication signals, the addresses being indicative of at least one of the central control device, the operational devices, the conveyor modules and zones associated with the conveyor modules. The operational devices are programmed with instructions concerning the addresses to and from which the communication signals should be provided.

The present invention further relates to a method of communicating information among components of a conveyor system including at least first and second conveyor modules supporting a plurality of operational devices. The method includes providing a central control device, and providing a plurality of intermediate controllers on the first and second conveyor modules, where each of the intermediate controllers is coupled to at least one of the operational devices by a respective dedicated connection. The method additionally includes providing an address-based network coupling the central control device with each of the plurality of intermediate controllers, and sending a plurality of commands from the central control device to the intermediate controllers by way of the address-based network. Each of the commands is directed to its respective intermediate controller based upon a respective command address associated with the respective command.

Thus it is one object of the invention to use an address-based network to communicate between conveyor sections and also provide for global communications capabilities, thus resulting in a reduced wiring burden.

The object sensor may includes a communications port connecting to the address-based network for sending outgoing addressed data and the logic circuitry receives the object sensor signal as an incoming addressed message from the communications port. Alternatively or in addition, the motorized roller assembly may include a second communications port for connecting to the address-based network for receiving the control signal as incoming addressed data.

Thus it is another object of at least one embodiment of the invention to reduce wiring within the conveyor section by placing intra-conveyor communications also on the network.

The controller may include a power input for receiving electrical power and wherein the control signal may be power to a motor of the motorized roller assembly controlled by the controller.

Thus it is another object of the invention to integrate motor drive electronics into the controller to simplify the motorized roller assembly.

The controller may be incorporated into the motorized roller assembly. Thus is it another object of the invention to significantly reduce the cost of the conveyor section electronics by integrating the communications port and logic into the motorized roller assembly.

The modular conveyor system may further including a network cable having an upstream connector and a downstream electrical connector near the upstream and downstream ends of the conveyor section for connecting to downstream and upstream electrical connectors, respectively, of address-based network cable sections of downstream and upstream connector sections, respectively. The cable may be substantially equal in length to the conveyor section.

Thus it is another object of the invention to produce a conveyor system with electrical modularity commensurate with its mechanical modularity. By incorporating a section of a shared network cable into each conveyor section, conveyor sticks may be electrically connected for inter-stick communication and global communications by joining a single upstream and/or downstream electrical connector.

The conveyor section may include multiple controllers each associated with a motorized roller assembly and an object sensor.

Thus it is another object of the invention to simplify wiring within the conveyor section as well as between conveyor section.

The logic circuitry may be programmable and communicate with the communications port to receive programming via incoming addressed data. The data may include that to control the motorized roller assembly according to parameters selected from the group consisting of: direction of the motorized roller assembly, speed of the motorized roller assembly, delay time between a sensing of an object by an object sensor and activation of the motorized roller assembly, a mode of operation for the conveyor section of accumulation, singulation release and slug release. Alternatively or in addition, the logic circuitry may accept incoming addresses indicating an address, the other conveyor sections from which the external object presence signal is received. Further, the logic circuitry may communicate with the communication port to transmit outgoing addressed data selected from the group consisting of jam indication, state of the object sensor, direction of the motorized roller assembly, speed of the motorized roller assembly, current drawn by the motor, and temperature of a motor of the motorized roller assembly.

Thus it is another object of the invention to provide centralized functions in the conveyor sticks without sacrificing their ability to operate autonomously.

The foregoing and other objects and advantages of the invention will appear from the following description. In this description, reference is made to the accompanying drawings which form a part hereof, and in which there is shown by way of illustration, a preferred embodiment of the invention. Such embodiment does not necessarily represent the full scope of the invention, however, and reference must be made therefore to the claims for interpreting the scope of the invention.

DETAILED DESCRIPTION OF THE INVENTION

Figure 1:
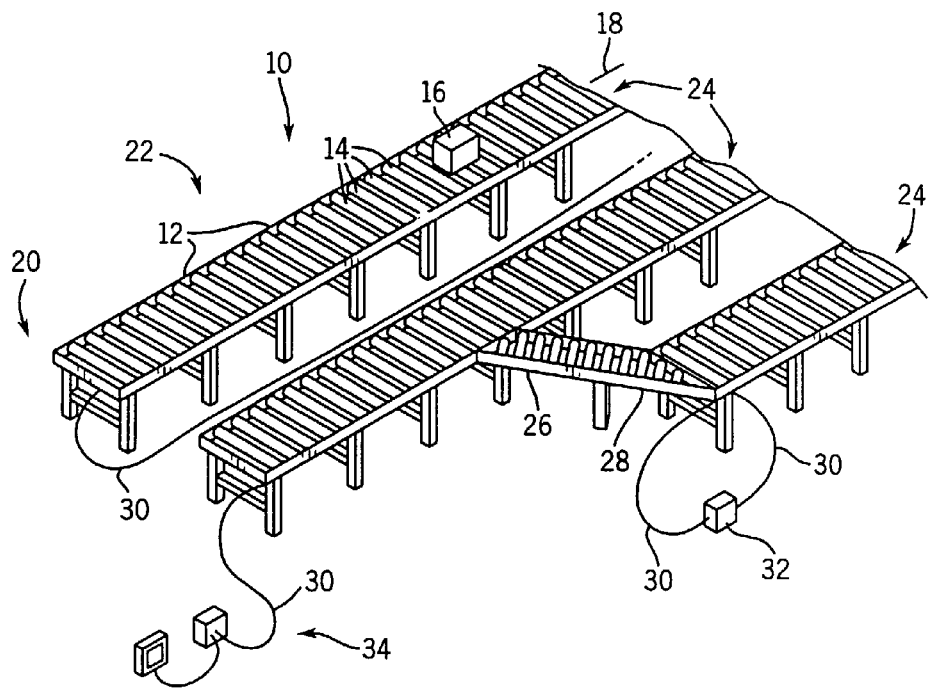
FIG. 1 is a perspective view of an example of a multi-bank conveyor system made up of a variety of modular conveyor sticks, the banks attached having continuous network cables attached at one end to a bridge and a central industrial controller.

Referring now to FIG. 1, a conveyor system 10 per the present invention may be assembled from a variety of conveyor sticks 12, each providing upwardly exposed rollers 14 for moving objects 16 along a conveyor axis 18. In the most general case, the rollers 14 of the conveyor sticks 12 are reversible and thus object 16 may move in either direction along axis 18. Nevertheless, an arbitrary "upstream" end 20 and "downstream" end 22 may be defined for each conveyor section representing one direction of flow along axis 18 for the processes of accumulation and slug release.

The conveyor sticks 12 may be arranged in one or more parallel banks 24 and may include alternative conveyor sticks 26 having diverter branches 28 providing a bifurcated path splitting a single upstream bank 24 into multiple downstream banks 24. The diverter conveyor sticks 26 may include a movable wall which pushes packages either to the left or to the right.

As depicted at an upstream end 20 of the banks 24, a continuous network cable 30 may connect each bank 24 (e.g., upstream ends 20 of one bank 24 to the down stream ends 22 of a next bank 24) to a central programmable logic controller 34 also as known in the art.

In a preferred embodiment, the network cable 30 provides for serial communication of data in packets having associated addresses identifying the destination or source of the data of the packet. This addressing allows the conductors of the network cable 30 to be shared among many devices while data may nevertheless be directed to or identified to particular ones of those devices. In this regard, typically a destination address is linked to the packet indicating the device for which the data is intended. However, a source address may also be attached to the packet and the device for which it is intended may have a stored table of addresses from which it will receive devices. Broadcasting protocols may also be implemented on the network cable 30. The DeviceNet standard based on the CAN controller protocol may be suitable for this purpose but other network protocols may be used instead. A network cable 30 for the DeviceNet standard used four conductors, two for supporting data communication and two for providing power.

Figure 2:
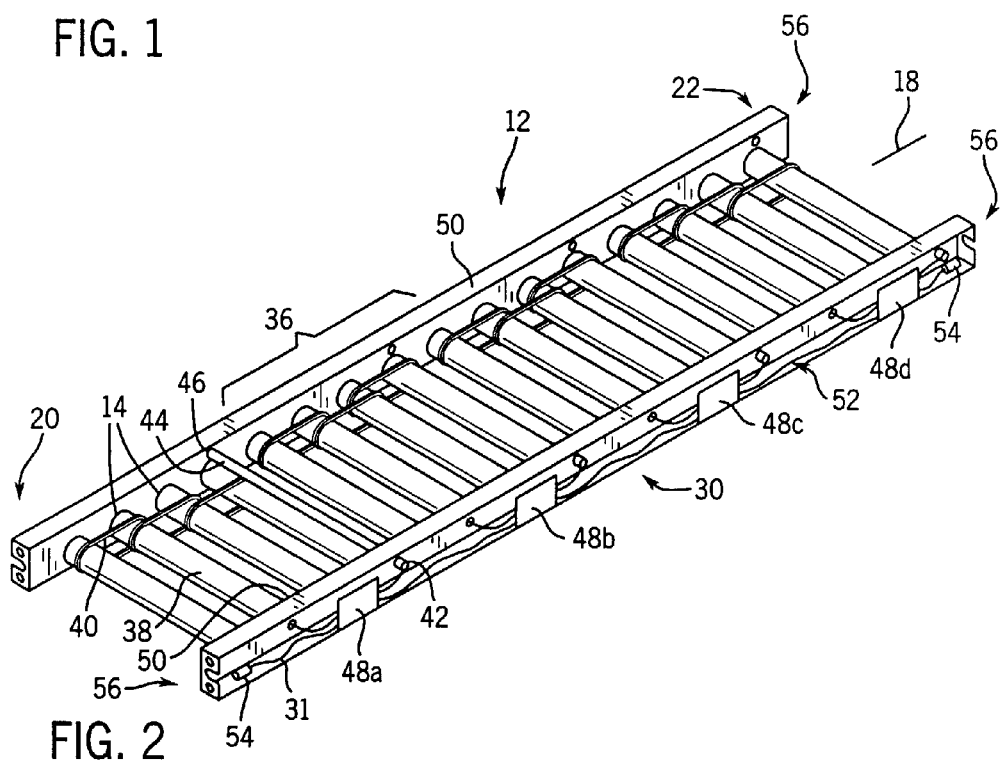
FIG. 2 is a detailed perspective view of an example conveyor stick of FIG. 1 showing its division into zones, each with a separate controller, motor and sensor, the controllers connected together by a shared network cable section having connectors at upstream and downstream ends.

Referring now to FIG. 2, a single conveyor stick 12 divides its rollers 14 into multiple zones 36. Thus for a typical conveyor stick 12 having a length between its upstream end 20 and its downstream end 22 over ten feet, four, 2.5 foot zones 36 may thus be established, each with multiple rollers 14. Each zone 36 may include one motorized roller assembly 38, for example, those having an internal motor mechanism of a type well known in the art. This motorized roller assembly 38 communicates its motion by means of belts 40 with the other rollers 14 of the zone 36.

Positioned at a downstream end of each zone is a sensor 42 such as may receive a light beam 44 from an emitter 46, the beam 44 crossing the upper surface of the last roller 14 of the zone 36 at its downstream side in a direction substantially perpendicular to the conveyor axis 18. An object 16 breaking the beam 44 signals the presence of an object 16 at the zone.

For each zone 36, a controller card 48 communicates with the sensor 42 and with the motorized roller assembly 38 to provide control functions as will be described. Each controller card 48 also communicates in shared fashion with a cable section 31. Specifically, the cable section 31 runs in "daisy-chain" fashion connecting to each of controller cards 48(a), 48(b), 48(c) and 48(d) of the conveyor stick 12, each controller card 48 communicating with rollers and sensors of their respective zones 36. The diverter conveyor sticks 26 may include its own controller card 48 (not shown) and thus may be easily integrated into the rest of the operation of the conveyor system 10.

Figure 4:
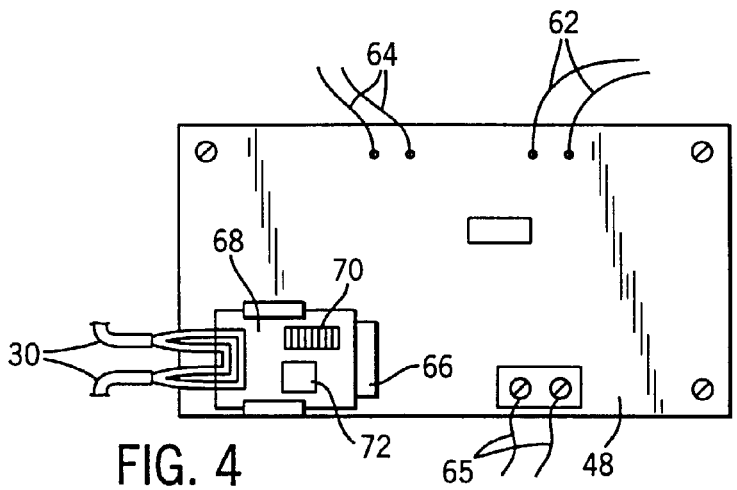
FIG. 4 is an elevational view of a controller of FIG. 2 showing a detachable communication port for receiving a shared network cable section and providing control logic for an associated zone of the conveyor stick.

Referring momentarily also to FIG. 4, controllers 48 provide for control leads 62 leading to the sensor and power leads 64 leading to the motorized roller assembly 38. In the simplest embodiment, the controller card 48 principally includes level shifting and power circuitry necessary for supporting the motorized roller assembly 38 and sensor 42. Separate power leads 65 provide power that is switched by the controllers 48 directly to motors of the motorized roller assemblies 38. A connector 66 is provided to receive a network card 68 which attaches to the network cable and provides the necessary protocol for communication on the network cable 30. The controller card 48 will be described in more detail below.

The controller cards 48 are held by side panels 50 of the conveyor stick 12 which serve also to support the rollers 14. The side panels 50 provide integral cable raceways 52 into which the controller cards 48(a) through (d) may fit as well as the cable section 31. Cable section 31 terminates in connectors 54 at its upstream and downstream ends adjacent to the upstream and downstream ends of one of the side panels 50.

Figure 3:
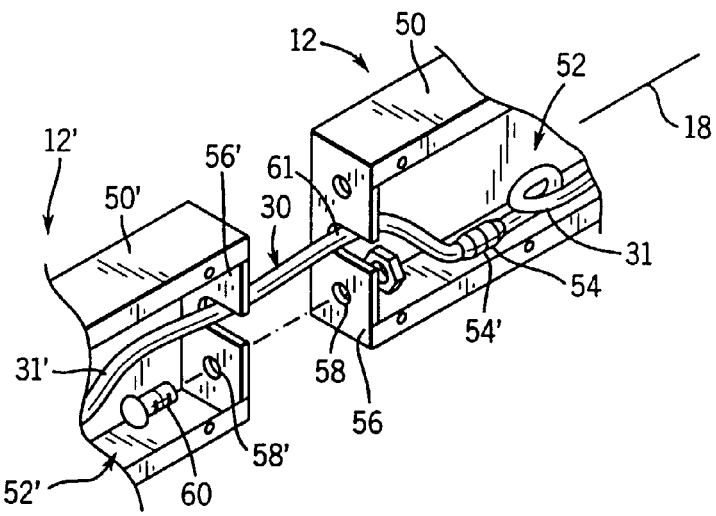
FIG. 3 is a detailed perspective view of the upstream end of FIG. 2 of the conveyor stick of FIG. 2 showing connection of shared network cable sections between connected conveyor sections to form a continuous shared network cable.

Referring now to FIG. 3, the side panels 50 terminate at their upstream and downstream ends 20 and 22 at a mechanical connector 56 being generally a plate perpendicular to the conveyor axis 18 and including two axial holes 58. The mechanical connector 56 and its axial holes 58 match with corresponding mechanical connectors 56' and holes 58' of an adjacent conveyor stick 12'. Fasteners 60 inserted through these holes 58' and 58 allow assembly of the conveyor sticks 12 together into a conveyor system 10.

A notch 61 in the mechanical connector 56 permits passage of either cable section 31' into the raceway 52 or cable section 31 into the raceway 52' where they may be attached to each other via electrical connectors 54. A small amount of additional slack is provided in the cable sections 31 and 31' to permit this operation while preserving complete enclosure of the network cable 30 (made up of cable sections 31) within the raceway 52 or 52'.

Thus assembly of conveyor sticks 12 into a conveyor system 10 is a simple matter of joining mechanical connectors 56' and electrical connectors 54 of each new conveyor stick 12 as it is added.

Referring again to FIG. 4, the network card 68 includes an address switch 70 for setting a "media access layer" address of the controller card 48 so that data sent on the network cable 30 by different devices (controllers 48 and central controller 34) may be distinguished. Before or at the time each conveyor stick 12 is added to the conveyor system 10, its controller cards 48(a)–48(d) are given a unique address via switches 70. To the extent that the address space, being the total number of unique addresses allowed by the network, may be limited to a number less than the total number of controller cards 48(a) to 48(d), a bridge 32 of a type known in the art may be connected between different groupings of the conveyor sticks 12 to provide for an effective expansion of the addresses that may intercommunicate as will be described further below.

Typically, during operation of the conveyor system 10, each controller card 48 will receive data from the central controller 34 but will provide data to the central controller 34 only by request from the central controller 34 under a simple director/follower protocol. The network card 68 will decode only those messages addressed to it according to low level procedures well known in the art.

All pertinent data necessary for control of the conveyor stick 12 may be downloaded from the central controller 34 to the controllers 48 including, for example, the desired motor speed and/or direction for the motorized roller assembly 38 and delay times between actuations of the motorized roller assembly 38 and changes of state of the sensor 42. Commands such as for accumulation, singulation release and slug release can be issued from a central location or from local switches on controllers also attached to the network cable 30.

Likewise data from the controller card 48 may be relayed to the central controller 34 including indications of jamming, the state of the sensor 42, the state of the motorized roller assembly 38, the temperature of the motorized roller assembly 38, current draw of the motor, etc. This information, as uploaded to central controller 34, may provide a centralized picture of the operation of the conveyor system 10.

In addition, the central controller 34 may manage the interconnection of the controllers 48 with its adjacent zones in its conveyor stick 12, or in upstream or downstream conveyor sticks 12 by providing each controller card 48 with the address of other controllers 48 associated with its upstream and downstream zones from which or to which sensor data must be sent. In this way additional wiring for this purpose is eliminated. Further, reconfiguration of the conveyor system 10 may be easily performed from a central location.

In a preferred embodiment, the logic circuitry necessary for the controller card 48 to perform the various operations such as accumulation, slug release and singulation release, is contained in a single integrated circuit 72 in the network card 68, the integrated circuit 72 also providing the communication protocol with the network cable 30. As used herein, logic circuitry should be considered to embrace discrete logic devices implemented logical functions as well as programmable gate arrays and the like as well as circuits such as microprocessor and microcontrollers executing a stored program. In this latter regard, the integrated circuit 72 may handle low-level protocols including timing, arbitration for the shared network cable and detection of network errors and the like. Additional description of the operation and constructions of the integrated circuit 72 is found in co-pending U.S. patent application Ser. No. 09/559,625 filed Apr. 27, 2000 and entitled: Method And System For Selecting Controller Output Value Source; and U.S. patent application Ser. No. 09/574,982 filed May 19, 2000 and entitled: Situational Aware Output Configuration and Execution, each of which was assigned to the assignee of the present application and is hereby incorporated by reference.

By investing the integrated circuit 72 with both communication protocol and control logic capabilities, the controller card 48 may be extremely simple providing for only basic motor and sensor control activities while the logic of these operations is supported in the integrated circuit 72. Non-volatile memory within integrated circuit 72 allows reconfiguration of the logic by commands from the central controller 34 providing even greater configuration flexibility.

In the preferred embodiment, after configuration by the central controller 34, much of the communication on the network cable 30 is peer to peer between controller cards 48. The content of this communication is similar to that of the prior art, but the data is communicated over the shared network cable 30 much reducing wiring burden in the raceways 52. In one embodiment, central controller 34 may be eliminated or removed after configuration and the system may operate without the central control in totally peer to peer mode. Alternatively, a simple interface device may be attached in view of the central controller 34 to provide an indication of the operation of the system.

Nevertheless, such peer-to-peer communication is not necessary and it is possible to operate the present invention in a mode in which all sensor signals are relayed to the central controller 34 and commands are returned to the controller cards 48 and no logic need be contained on the controller card 48.

Referring again to FIG. 1, multiple network cables 30 may be connected by a bridge 32 serving a number of different functions. The first function of the bridge 32 is that of mapping redundant address spaces to different addresses so that limited address space protocols such as CAN may be expanded arbitrarily. Thus if addresses one through 128 are used in each bank 24, the bridge 32 may concatenate a bank address to those addresses thereby differentiating them. Bridge 32 also allows interconnection of network cables 30 in situations where a straightforward daisy chaining is difficult, for example, between banks 24 or branches in the case of diverter conveyor sticks 26 which provide a branching topology.

Figure 5:
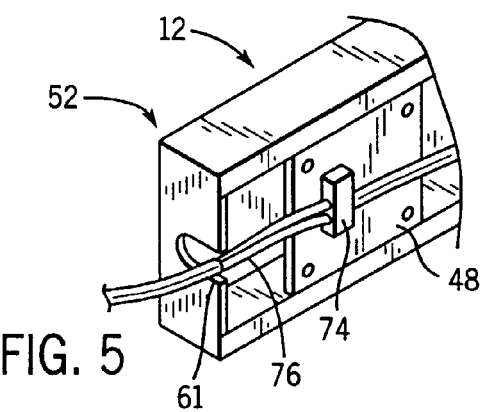
FIG. 5 is a figure similar to that of FIG. 3 showing an alternative wiring method using a semi-continuous network cable "daisy chained" along the rails of the conveyor sticks.

Referring to FIG. 5, in an alternate embodiment, the controller cards 48 may be given insulation displacement type connectors 74 such as allow for connection of the controller card 48 to a semi-continuous ribbon cable 76. After mechanical connection of the conveyor sticks 12 into ranks 24, the entire data connection of the conveyor sticks 12 may be handled by unreeling the ribbon cable along the raceways 52 and clamping it along its length beneath the insulation displacement connectors 74. Higher gauge power wiring may then be run and the connection process is complete.

It will be recognized from the above description that the location of the various functional components of the above described invention may be readily varied and thus that the controller may be incorporated in the motorized roller assembly or separate therefrom and that the drive electronics for the motor of the motorized roller assembly may be in the motorized roller assembly or separate or incorporated into the controller.

It is specifically intended that the present invention not be limited to the embodiments and illustrations contained herein, but modified forms of those embodiments including portions of the embodiments and combinations of elements of different embodiments as come within the scope of the following claims.

We claim:

1. A method of operating a conveyor system having a plurality of conveyor sticks positioned in succession with one another, the method comprising:

providing a plurality of controllers respectively associated with the respective conveyor sticks;

coupling the controllers with one another and a central control device by way of an address-based network; and sending information from the central control device to given controllers via the address-based network, wherein the information sent from the central control device to the given controllers provides the given controllers with addresses of other controllers to and from which the given controllers may send and receive sensor data used to control the given controller's respective conveyor stick over the address-based network;

wherein additional wiring for communication of sensor signals between controllers and the need for rewiring of sensors between controllers is eliminated.

2. The method of claim 1, further comprising:

decoupling the central control device from the address-based network, wherein the controller's sending and receiving of sensor data used to control the controller's respective conveyor stick over the address-based network occurs after the central control device has been decoupled.

3. The method of claim 1, wherein the information sent from the central control device also includes at least one of a desired motor speed, a desired motor direction, a delay time between an actuation of a motor and a change of state of a sensor.

4. The method of claim 1, further comprising sending additional information from at least one of the controllers to the central control device.

5. The method of claim 4, wherein the additional information concerns at least one of a jamming indication, a state of a sensor, a state of a motor, a temperature of the motor, and a current draw of the motor.

6. The method of claim 1, wherein the sensors are light sensors detecting the presence of objects on the conveyor stick.

* * * * *